United States Patent [19]

Engstrand

[11] Patent Number: 5,330,297
[45] Date of Patent: Jul. 19, 1994

[54] BORING TOOL

[75] Inventor: Sven Engstrand, Sandviken, Sweden

[73] Assignee: Sandvik AB, Sandviken, Sweden

[21] Appl. No.: 21,560

[22] Filed: Feb. 24, 1993

[30] Foreign Application Priority Data

Feb. 24, 1992 [SE] Sweden ............................. 9200543

[51] Int. Cl.$^5$ ............................................. B23B 51/00
[52] U.S. Cl. .................................. 408/153; 408/185; 408/197
[58] Field of Search ................ 408/153, 181, 185, 197

[56] References Cited

U.S. PATENT DOCUMENTS

| 4,043,697 | 8/1977 | Eckle. | |
|---|---|---|---|
| 4,231,691 | 11/1980 | Pape et al. . | |
| 4,242,018 | 12/1980 | Schürfeld . | |
| 4,464,088 | 8/1984 | Dehn | 408/185 |
| 4,632,609 | 12/1986 | Johne | 408/197 |

FOREIGN PATENT DOCUMENTS

| 0501009 | 9/1992 | European Pat. Off. . |
| 3811775 | 12/1988 | Fed. Rep. of Germany . |
| 3622638 | 5/1989 | Fed. Rep. of Germany . |
| 3829609 | 12/1989 | Fed. Rep. of Germany . |
| WO91/08853 | 6/1991 | Switzerland . |

Primary Examiner—Daniel W. Howell
Attorney, Agent, or Firm—Burns, Doane, Swecker & Mathis

[57] ABSTRACT

A boring tool comprises a body having, at a free end thereof, two insert holders which are radially adjustable by displacement relative to a groove defined by two opposing boundary surfaces and accommodating two elongate guide lugs on the insert holders. The groove merges, at opposite, parallel edges, into first support surfaces, which are each inclined relative to the tool axis, in a preferred embodiment in a rearward-outward direction from the edge so as to form an acute-angled wedge-shaped portion of material between each of the first support surfaces and a respective groove-defining surface. The support surfaces are each adapted to cooperate with similar, second support surfaces on the holders, the other support surfaces are similarly inclined, more specifically relative to boundary surfaces of the guide lugs, at substantially the same acute angle as the angle between cooperating surfaces of the wedge-shaped portions of the tool body.

7 Claims, 2 Drawing Sheets

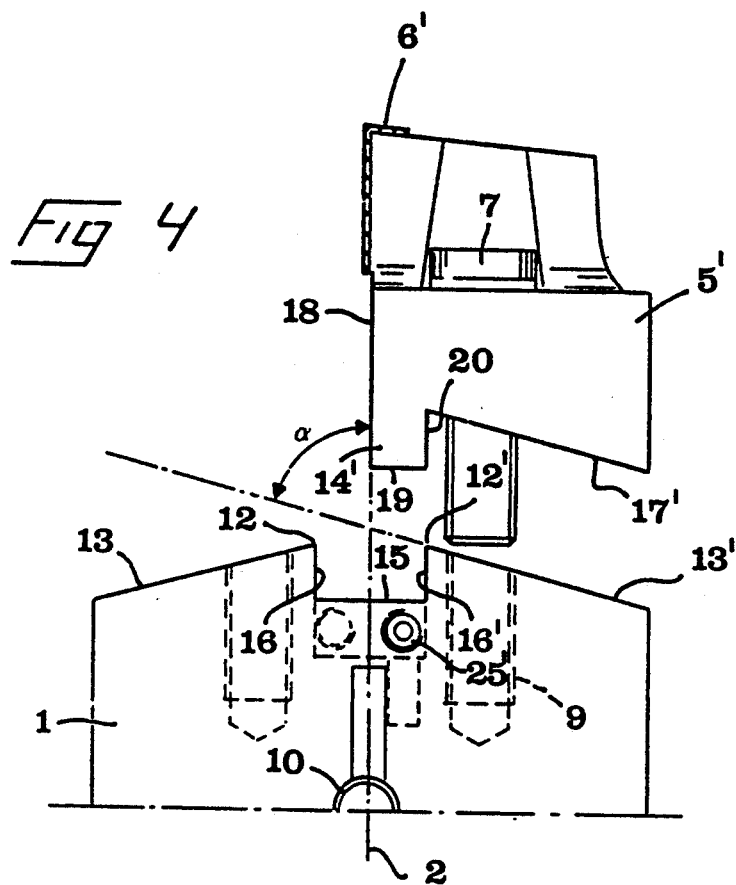
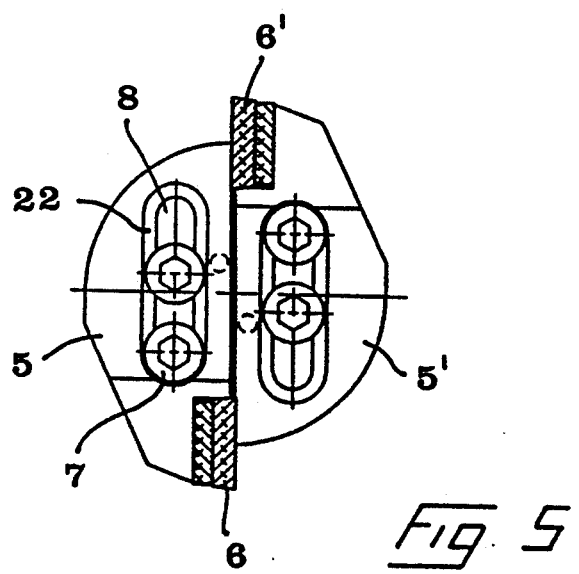

BORING TOOL

FIELD OF THE INVENTION

This invention relates to a boring tool of the type comprising a suitably rod-shaped body having a geometric axis or tool axis, said body being adapted, at a free end thereof, to receive two insert holders which project in radially opposite directions and which are each adjustable in different radial positions by displacement along a guide structure in the form of a groove provided in the free end of said body and extending transversely of said tool axis, said groove being defined by two opposing boundary surfaces and having a sufficient width for accommodating two elongate guide lugs on said two holders, each of said holders being lockable in a desired position of radial adjustment by at least one locking screw which transverses a through hole in the holder and can be tightened in an associated threaded hole in said body.

DESCRIPTION OF THE PRIOR ART

Boring tools of the above type are previously known from DE 38 29 609, DE 38 11 775 and DE 36 22 638. A common feature of the boring tools disclosed in these publications is that the support surfaces for the insert holders adjacent the transverse groove in the free end of the tool body extend at right angles to the tool axis. This arrangement in the prior art gives poor stability to the insert holders as the tools, when processing a workpiece, are subjected both to tangential forces tending to turn the insert holders, and to bending forces tending to upset or tilt the insert holders.

Also known in the art are tools (see e.g. SE 7608273-4) in which the guide structure is composed of a plurality of elongate, parallel teeth or crests formed in the end of the tool body and in the undersides of the insert holders. A major drawback of such elongate guide teeth is however that it is both difficult and costly in large-scale production to give the teeth of the tool body good dimensional accuracy and fit. Another drawback of prior art tools of this type is that, at least when in standard design, they do not permit so-called step-boring, i.e., a boring operation in which one insert is cutting slightly ahead of the other insert, as seen in the axial direction of feed.

W091/08853 and DE 28 11 965 disclose boring tools having support or abutment surfaces which are inclined relative to the tool axis. However, the inclination of the abutment surfaces in these tools is in the "wrong direction", in that they extend in an outward-forward direction from the boundary edge concerned. In W091/08853, each support or abutment surface extends from a pointed groove bottom, which is located beside the center tool axis quite far into the pointed end portion of the tool body or rod, in an obliquely outwardly-forward direction up to a point located considerably ahead of the groove bottom. In DE 28 11 965, a toothed abutment surface similarly extends from a central groove bottom, which is located far into the pointed end portion of the tool body, in an obliquely outward-forward direction up to a point located ahead of the groove bottom. Thus, these two tools have no part corresponding to the wedge-shaped portion of material of the present invention, which is defined by the support surfaces inclined in a rearward-outward direction, which means that tilting forces acting on the insert holders will not be counteracted by any such portions of material.

SUMMARY OF THE INVENTION

The present invention aims at overcoming the drawbacks inherent in prior art boring tools. A basic object of the invention is thus to provide a boring tool in which the guide structure for guiding and locking the insert holders not only is of simple geometry and places low demands on tolerance accuracy, but also ensures good retention and stability of the insert holders including when the insert holders are subjected to severe stresses.

A further object is to provide a boring tool in which the guide structure makes it possible, by simple means, to shift the insert holders and the associated inserts from a state of normal operation, in which the two inserts are located at the same distance from the free end of the tool body, to a step-boring state, in which the inserts are located at different distances from the tool body, as seen in the axial direction. Moreover, the tool according to the present invention permits ready switching to single-insert boring without jeopardizing the stability of the single insert holder.

These objects and others are satisfied by the present invention defined in the claims.

BRIEF DESCRIPTION OF THE DRAWING FIGURES

A preferred embodiment of the present invention will be described in greater detail with reference to the accompanying drawings wherein like members bear like reference numerals and wherein:

FIG. 4 is a partial side view, on an enlarged scale, showing the contour of the free end of the tool body as well as of an insert holder cooperating therewith; and FIG. 5 is a top plan view of the tool with the two insert holders mounted in place.

RELATED DESCRIPTION OF THE PREFERRED EMBODIMENT

Figure 1:
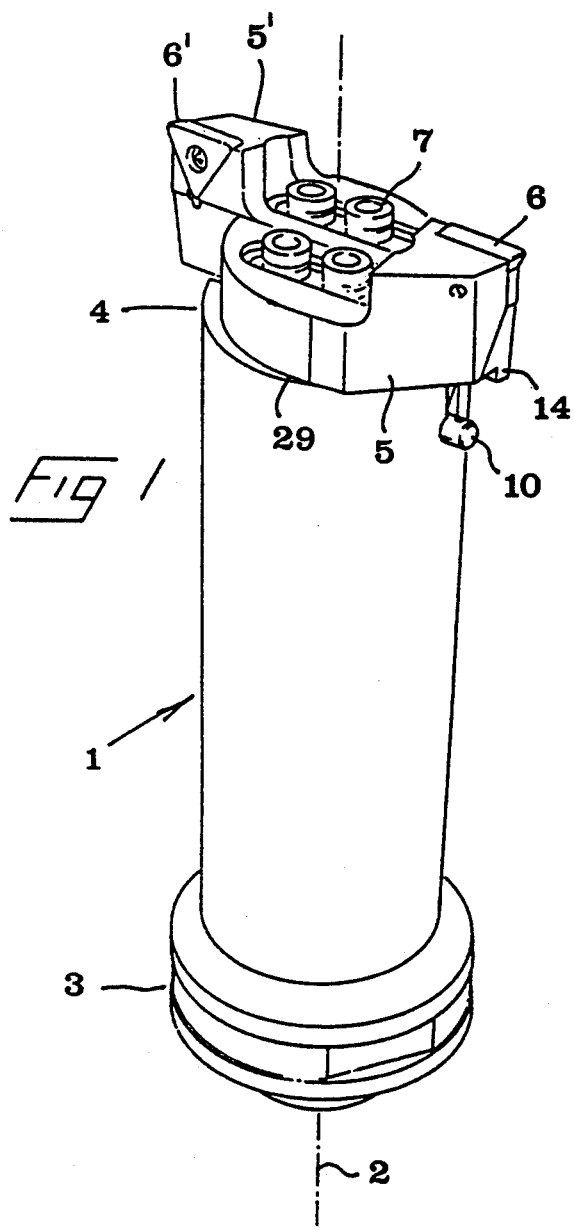
FIG. 1 is a perspective view of a boring tool according to the invention.

Referring now to the drawings, the boring tool shown in FIG. 1 comprises a tool body, generally designated 1, which in practice suitably is in the form of a substantially solid rod. This rod is generally, although not necessarily, rotatable about a geometric axis or tool axis 2. One end 3 of the rod is suitably fixable in a tool holder (not shown), while the opposite free end 4 serves to receive two holders 5, 5', each carrying a replaceable insert 6 and 6', respectively. The two insert holders 5, 5' are adjustably movable in the radial direction, i.e., at right angles to the longitudinal axis 2, and are lockable in desired positions of radial adjustment preferably by locking screws 7. In this manner, the holders can be adjusted so as to allow the inserts to make holes of different diameter. In this context, it should be noted that boring tools of the type here concerned are intended for boring existing, roughly processed holes in a workpiece (e.g. holes made in a plate of sheet metal by means of a cutting torch), in order to provide a hole having a smooth surface and relatively high dimensional accuracy.

In the illustrated embodiment, each insert holder 5, 5' is held in place by means of two locking screws passing through an elongated through hole 8 in the insert holder, the screws being tightened in threaded holes 9 in the tool body 1. Since the hole 8 is elongated in a radial direction, each insert holder is continuously adjustable in this case between different positions of radial adjustment, the outer and inner end positions of the holder being defined by the radial length of the hole.

From the circumferential surface of the rod-shaped body 1 protrude two pin-shaped projections 10, 10' having nozzle apertures for spraying a coolant on to each of the inserts 6, 6' for cooling them and removing chips cut from the workpiece by the inserts.

Figure 2:
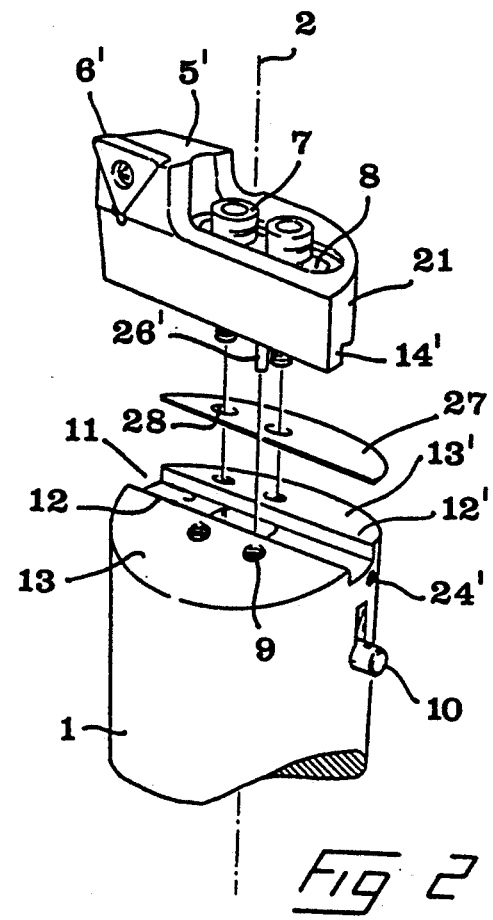
FIG. 2 is a partially exploded view showing an insert holder and a spacer washer separated from the tool body.
Figure 3:
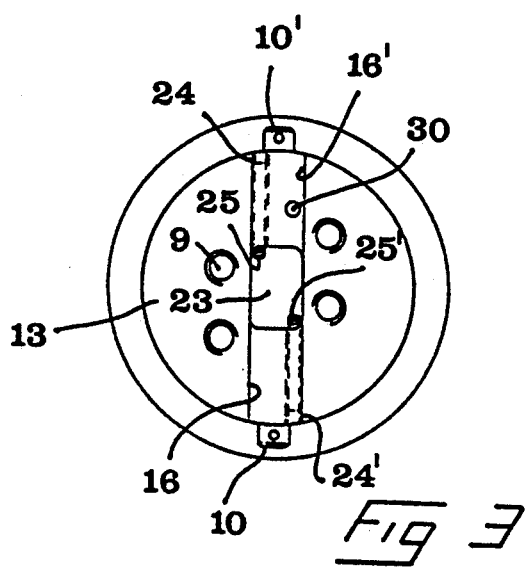
FIG. 3 is a top plan view of the free end of the tool body.

Reference is now made to FIGS. 2–4 illustrating how the free end 4 of the tool body 1 is designed with a groove 11 extending transversely of, preferably perpendicular to the axis 2, and merging via linear edges 12, 12' into a pair of first inclined support surfaces 13, 13'. More specifically, the groove 11 extends throughout the entire width of the tool body and opens by diametrically opposed end openings into the circumferential surface of the tool rod. The width of the groove is sufficient for accommodating two elongate guide lugs 14, 14' formed on the underside of the two insert holders 5, 5'. The groove 1 is defined by a suitably planar bottom surface 15 (see FIG. 4) and by two similarly suitably planar side walls 16, 16', which are parallel to each other and to the longitudinal axis 2 of the tool body. The angle of inclination α of the support surfaces 13, 13' relative to the axis 2 may in practice be in the range of 65°–85°, suitably 70°–80°. In practice, the angle α may amount to about 75°. In other words, each support surface 13, 13' is inclined about 15° with respect to an imaginary plane perpendicular to the axis 2.

Each such first support surface, e.g. the support surface 13', is intended to cooperate with a second support surface 17' on the underside of the insert holder 5' (the holder 5 has a corresponding surface 17 (not shown)). This other support surface 17' extends at the same angle of inclination α to a planar front side or front surface 18 as does the support surface 13' to the tool axis 2. The guide lug 14' is defined by a portion of the front surface 18 as well as by a lower surface 19 and a rear surface 20 of rectangular shape. It goes without saying that the second support surface 17' extends from the rear lug-defining surface 20 out to the at least partially curved surface 21 which, together with the front surface 18, defines the insert holder. The width of each guide lug 14', i.e., the shortest distance between the surfaces 18 and 20, is in practice markedly, although only slightly less than half the width of the groove 11, the groove width being the shortest distance between the two planar, in this instance parallel boundary surfaces 16, 16'. In practice, this dimensional difference should be in the order of some thousandths up to a few hundredths mm, such that a play in the order of 0.01–0.03 mm will exist between the front surfaces 18 of the two insert holders 5, 5' facing each other, when these holders are mounted with the guide lugs 14, 14' accommodated in the groove.

In this context, it should also be pointed out that the threaded holes 9 for the locking screws 7 extend parallel with the tool axis 2, while the planar boundary surfaces 22 (see FIG. 5) which surround the long holes 8 and against which the heads of the screws can be applied, extend in a plane substantially perpendicular to the front surfaces 18. When tightening the locking screws 7 in the threaded holes 9, the insert holders 5, 5' will thus move parallel to the tool axis 2.

Reference is now made to FIGS. 2 and 3 illustrating the provision, in the bottom surface 15 of the groove 11, of a centrally disposed, countersunk space 23 having a substantially rectangular contour. In this countersunk space open the ends of two internally threaded bores 24, 24', the other ends of which open in the circumferential surface of the tool body 1. In each bore, there is inserted an adjusting screw 25 and 25', respectively, the former of which is located in the immediate vicinity of the groove-defining surface 16, while the other adjusting screw 25' is located in the immediate vicinity of the groove-defining surface 16'. The adjusting screw 25' is adapted to act on a projection 26' which extends from the guide lug 14' down into the space 23 and which in this case consists of a simple pin (similarly, the adjusting screw 25 is adapted to act on a driver pin on the insert holder 5 (not shown)). Each adjusting screw is easily accessible to an adjustment tool, e.g. a screwdriver, through the end openings of the bores 24, 24' opening into the circumferential surface of the rod 1.

FIG. 2 shows a spacer member in the form of a washer 27. In practice, the washer may be a plate of thin sheet metal, the contour of which substantially corresponds to the contour of the two support surfaces 13, 17, there being provided through holes 28 in the sheet metal plate in a number corresponding to the number of locking screws 7 for each insert holder.

When the two inserts 6, 6' are to be set in the desired positions of radial adjustment, the locking screws 7 are maintained slightly tightened in the associated threaded holes so as to apply the insert holders against the tool body with only a small pressure. In this condition, the surfaces 13 and 16, on the one hand, will serve as guide means for the insert holder 5, and the surfaces 13' and 16', on the other hand, will serve as guide means for the other insert holder 5'. The displacement of each insert holder along the guide surfaces is ensured with the aid of the adjusting screws 25 and 25', respectively, which when screwed from an inner end position will urge the insert holder, by the intermediary of the driver pin 26, 26', in a direction outwards to the desired position of radial adjustment. When the two insert holders have been set in the desired positions by the adjusting screws, the locking screws 7 are tightened firmly so as to lock the insert holders in this position. In this condition, there exists between the insert holders, more specifically between their front surfaces 18, a gap whose width may be in the order of 0.02 mm.

In the subsequent processing of the workpiece, tangential forces appear which tend to turn each insert holder along the surface plane 13 and 13', respectively, and bending forces tending to upset or tilt each insert holder about a tilting point situated in the area of the circumferential surface of the tool body (see point 29 in FIG. 1). In connection with the above-mentioned turning tendency along the surface plane 13, the insert holder will tend to climb up this plane, which is however prevented by the locking screws 7 of the insert holder and by the fact that two insert holders when in this condition have been pressed together so as to eliminate the gap initially existing therebetween. Tilting about the tilting point 29 is prevented by the locking screws 7, in combination with the fact that the locking lug 14 and 14', respectively, on the insert holder concerned is unable to pass the portion of material extending from each boundary edge 12, 12' downwards towards the bottom of the groove (the rear boundary surface 20 of the guide lug 14, 14' is pressed against the lateral boundary surface 16 and 16', respectively, of the groove 11 and is unable to pass it).

One advantage of the invention is that the guide structure provided by the guide lug of each insert holder, in combination with the inclined support surfaces, will ensure, despite its simple geometry, a highly solid and reliable retention of the insert holder and, hence, of the insert in the desired position of radial adjustment, also in those cases where the tool is subjected to severe stresses. Such firm retention of the insert holders is possible to achieve despite relatively moderate tolerance requirements. This means, in actual practice, that the components employed can be manufactured at a low cost. A further advantage is conferred by the fact that a simple spacer washer 27 can be placed between each insert holder and the underlying planar support surface 13 and 13', respectively, of the tool body with a view to changing the axial position of the insert on the holder. In this manner, the inventive tool can be quickly and easily shifted from a normal state of operation, in which the tool inserts are situated at the same axial distance from the tool body, to a step-boring state, in which one insert operates ahead of the other as seen in the axial direction. Since the tool can be designed with a certainly very narrow, although marked gap between the insert holders, these need not be manufactured in pairs (i.e., be fitted together) but may be manufactured and replaced individually.

Reference is now again made to FIG. 3 illustrating the provision of a hole 30 in the bottom 15 of the groove 11, more specifically adjacent one side of the groove, in this case the side wall 16'. The hole 30 a pin formed on a special blind holder or dummy (not shown) which carries no insert and which can be mounted on the tool body in case the tool is to be used for single-insert boring. The pin provided on the blind holder forms, in combination with the hole 30, a means for constantly ensuring that the blind holder is positively mounted in one of the two possible mounting positions (i.e., in this case adjacent the support surface 13') while the insert-carrying holder, having no such corresponding pin, is mounted in the other mounting position (i.e., in this case adjacent the support surface 13). Such positive mounting of the blind holder and of the insert holder, respectively, is of importance in those cases where the tool operation is stopped in a certain position (e.g. "at three o'clock") for tool change. When resuming the working operation, it is necessary that it is started with the insert holder, and not the blind holder, in the given position of stoppage.

It goes without saying that the invention is not restricted only to the embodiment described above and shown in the drawings. Thus, it is evident that the inventive tool can be designed for left-hand cutting as well as right-hand cutting, as shown in the drawings. Although it is preferred to design the two side surfaces 16, 16', defining the transverse groove 11, in parallel with the tool axis and with each other, it is also conceivable to incline them in a downward-outward direction, in which case the boundary edges 12, 12' alone will act against the associated guide lugs. Furthermore, the number of locking screws for each insert holder and blind holder, respectively, may vary considerably. For thin tool bodies, only one locking screw is thus sufficient, whereas tools having thicker bodies may require more than two such screws. In this context, it should also be pointed out that the tool can be designed with fixed positions of radial adjustment for the insert holders, i.e., without elongate holes, as illustrated, allowing continuous adjustment thereof. In such cases, the insert holders are provided with a number of fixed holes, between which the locking screws are shifted to achieve different positions of radial adjustment. Although the inventive tool, when in operation, is normally rotated while the workpiece is maintained stationary, it is also possible to foresee a case in which the boring tool is maintained stationary while the workpiece is rotated.

I claim:

1. A boring tool comprising a generally rod-shaped body having a geometric axis, said body being adapted at a free end thereof, to receive two holders which project in radially opposite directions and which are each adjustable in different radial positions by displacement along a guide structure including a groove provided in a free end of said body and extending transversely of said tool axis, said groove being defined by two opposed boundary surfaces and having a sufficient width for accommodating an elongate guide lug on each of said two holders, each of said holders being lockable in a desired position of radial adjustment by at least one locking screw which traverses a through hole in the holder and can be tightened in an associated threaded hole in said body, the groove merging, at opposite, substantially parallel edges thereof, into first support surfaces, which are each inclined relative to the tool axis to define an acute-angled wedge-shaped portion of material between each of said first support surfaces and a respective one of the boundary surfaces defining the groove, each of the support surfaces being adapted to cooperate with a respective second support surface on each of said holders, said second support surfaces being similarly inclined relative to boundary surfaces of said guide lugs, at substantially the same acute angle as the angle between cooperating surfaces of said wedge-shaped portions of said body.

2. A boring tool as claimed in claim 1, wherein the angle of inclination between each first support surface and the tool axis is in the range of 65°–85°.

3. A boring tool as claimed in claim 1, further comprising a spacer member insertable between the first inclined support surface on the body and the second, similar support surface on the holder, said spacer member positioning one of the holders slightly ahead of an outer edge of the other holder in the axial direction of the tool body.

4. A boring tool as claimed in claim 1, wherein the first supporting surfaces are inclined relative to the tool axis in a rearward outward direction from said edge.

5. A boring tool as claimed in claim 1, wherein only one holder contains a cutting insert.

6. A boring tool as claimed in claim 2, wherein the angle of inclination between each support surface and the tool axis is 70°–80°.

7. A boring tool as claimed in claim 3, wherein the spacer member is a sheet metal washer.

* * * * *